United States Patent Office 3,380,932
Patented Apr. 30, 1968

3,380,932
DEHYDROGENATION CATALYSTS CONTAINING CHROMIUM PHOSPHATE, AND THEIR METHOD OF PREPARATION
Douglas S. Alexander, Harvey Minnis, and Charles Ambridge, Sarnia, Ontario, Canada, assignors to Polymer Corporation Limited, Sarnia, Ontario, Canada, a corporation of Canada
No Drawing. Filed Apr. 8, 1965, Ser. No. 446,708
Claims priority, application Canada, May 12, 1964, 902,558
8 Claims. (Cl. 252—437)

ABSTRACT OF THE DISCLOSURE

A dehydrogenation catalyst of high activity for the dehydrogenation of monoolefinic hydrocarbons and alkylated aromatic hydrocarbons is prepared by coprecipitating minor amounts of chromium phosphate along with calcium nickel phosphate catalytic material.

---

The present invention relates to improved catalysts for use in the dehydrogenation of certain hydrocarbons and to the use of these catalysts in such dehydrogenation reactions.

The preparation and use as dehydrogenation catalysts of certain calcium nickel phosphates and mixtures of these phosphates with small proportions of chromium oxide have been described in the literature. These catalysts are particularly useful in the dehydrogenation of aliphatic monoolefins having at least four and preferably four to six carbon atoms in their unsaturated carbon chains to form the corresponding conjugated diolefins. In accordance with standard practice, reference herein to the "unsaturated carbon chains" of such a monoolefin denote the longest carbon chains which contains the olefinic double bond. They are, for instance, particularly useful in the dehydrogenation of normal butylenes to butadiene-1,3. These catalysts are also useful for the dehydrogenation of alkylated aromatic hydrocarbons containing at least two and preferably two to four carbon atoms in their alkyl groups, such as in the dehydrogenation of ethyl benzene to styrene. These catalysts may also be used in the dehydrogenation of cycloaliphatic olefins having five to eight carbon atoms in their olefinically unsaturated carbon rings and in the dehydrogenation of cycloalkanes having five to seven carbon atoms. Modified dehydrogenation processes have also been described in which these calcium nickel phosphates are used to catalyze the dehydrogenation of paraffinic hydrocarbons having at least three and preferably three to eight carbon atoms, such as in the dehydrogenation of butane, normal and iso-pentane and hexane. These catalysts contain from 7.5 to 9.2, preferably from 8.2 to 9.0 atoms of calcium per atom of nickel. Such calcium nickel phosphate catalysts differ from simple mixtures of calcium phosphate and nickel phosphate since mere admixture of these two salts produces a catalyst which is relatively ineffective in the aforementioned dehydrogenation reactions.

These known calcium nickel phosphate catalysts have been prepared by adding an aqueous solution of calcium and nickel salts, which solution generally contains from 7.5 to 9.2, preferably from 8.2 to 9.0, ions of calcium per ion of nickel, to an aqueous solution of a soluble phosphate while maintaining the resulting mixture in a neutral or preferably alkaline condition. Alternatively, such catalysts have been prepared by adding an aqueous solution of phosphoric acid and the calcium and nickel salts to an aqueous solution of an alkali such as ammonia. Although the ratio of calcium ions to nickel ions is of great importance, the relative proportion of phosphate ions has been widely varied. Normally, the phosphoric acid or soluble phosphate has been used in slight excess over the amount required to form the normal salt, but they have also been used in the exact proportions theoretically required to form such a salt, or in smaller or considerably greater proportions.

In these processes for the preparation of these known catalysts, it was important that the precipitation be completed under neutral or alkaline conditions, since the precipitate which is formed when the reaction mixture is acidic has inferior catalytic properties. The precipitation was generally carried out at a pH value of between 7 and 10. Examples of suitable nickel and calcium salts which have been used for preparing these catalysts are calcium and nickel chlorides, nitrates and acetates. Disodium phosphate, trisodium phosphate, dipotassium phosphate and diammonium phosphate are examples of suitable soluble phosphates which may be used in the first of the aforementioned processes for preparing these catalysts. It is also known that catalysts which have been precipitated from an alkaline medium containing an ionizable basic nitrogen compound, for example, ammonia, a water-soluble ammonium salt or a water-soluble amine or amine salt such as diethylamine, triethylamine or diethanolamine are particularly active. The presence of such a nitrogen compound is not, however, essential but it is for this reason that it is preferred to use ammonia as the neutralizing agent in the second of the aforementioned processes, namely the one in which a solution of phosphoric acid and the calcium and nickel salts is added to an aqueous solution of an alkali. Usually water has been employed as the solvent medium but the use of other aqueous solvents, e.g. aqueous alcohol, has been suggested.

In the preparation of these known catalysts, the precipitate is separated from the liquor and washed with water as thoroughly as possible. After washing, the product is dried to give a hard gel which may be crushed or otherwise reduced to granules which may be used directly as a dehydrogenation catalyst. It has, however, been preferred to crush the product to a powder and to prepare pills, tablets or pellets of a suitable size for use as a catalyst. Such pelleting may be effected by treating the powdered product with a lubricant such as graphite, a vegetable oil or a hydrocarbon oil which may subsequently be removed by vaporization or oxidation.

One previously proposed method for modifying these catalysts was based on the suggestion that mixtures of calcium nickel phosphate with a minor proportion of chromium oxide may be more catalytically active than the calcium nickel phosphate component alone. It has been suggested that the minimum temperature necessary for the catalytic dehydrogenation of olefins using a calcium nickel phosphate which is of itself of high catalytic activity may be lowered in some instances by as much as 100° C. by the admixture therewith of chromium oxide. It has further been suggested that, in some circumstances, such admixture of chromium oxide with the calcium nickel phosphate may permit the use of atomic ratios of calcium to nickel of from 6 to 12 but may cause excessive carbonization or other by-product formation if used at the same temperature as would be employed when effecting the dehydrogenation with the phosphate component alone but that such a mixture is satisfactory if used at a somewhat lower temperature.

In most instances, only a small proportion, such as about 2.0%, chromium oxide has been used in admixture with calcium nickel phosphate in order to obtain improved results but the chromium oxide may be used in smaller or larger proportions, if desired. In general, from 0.5 to 30% by weight of chromium oxide has been preferred. Large proportions of chromium oxide have the disadvantage, however, that they result in a catalyst material which cannot be shaped into active pellets having a sufficiently high mechanical strength and it is, therefore, more preferred to use from 0.5 to 5% by weight of chromium oxide.

The present invention is based on the discovery that it is possible further to improve the catalytic activity of calcium nickel phosphate catalysts, irrespective of whether or not they contain chromic oxide, by the incorporation therein of a minor proportion of chromium phosphate. The chromium phosphate is preferably incorporated by coprecipitation with the calcium nickel phosphate but it may be added to the catalyst material during or after the precipitation.

Accordingly, the present invention provides an improved dehydrogenation catalyst prepared by a process comprising the steps of:

(a) Precipitating calcium nickel phosphate under nonacidic conditions, preferably at a pH value of from 7.5 to 8.3, from a solution containing calcium ions, nickel ions and phosphate ions, the calcium and nickel being present in said solution in the relative proportions of from 6.0 to 12.0, preferably from about 7.5 to about 9.2, ions of calcium per ion of nickel;

(b) Separating the precipitated catalyst material from the precipitation medium; and (c) Finally drying the catalyst material, characterized in that a minor proportion of chromium phosphate is incorporated in the catalyst material.

As previously stated, the chromium phosphate is advantageously incorporated by coprecipitation with the calcium nickel phosphate from a solution containing calcium, nickel, chromium and phosphate ions, the calcium and nickel ions being present in the aforementioned relative proportions and the chromium ions being present to such an extent that the precipitated catalyst material contains a minor proportion of chromium phosphate. Examples of soluble chromium salts which may be used in this embodiment of the invention are chromic chloride, nitrate and acetate. In such incorporation by coprecipitation, from 0.5 to 10% by weight of chromium phosphate is preferably used.

The present invention also provides an improved process for the dehydrogenation of at least one hydrocarbon selected from aliphatic monoolefins having at least four and preferably four to six carbon atoms in their unsaturated carbon chains, alkylated aromatic hydrocarbons having at least two and preferably two to four carbon atoms in their alkyl groups, cycloaliphatic olefins having five to eight carbon atoms in their olefinically unsaturated rings and cycloalkanes having five to seven carbon atoms, which process comprises effecting the dehydrogenation at a temperature of from 500° to 750° C. and in the presence of steam and a catalyst according to the present invention.

The present invention is especially applicable to the dehydrogenation of butene-1 and/or butene-2 to butadiene, of iso-amylene to isoprene and of ethyl benzene to styrene. It can also be applied to the dehydrogenation of a mixed olefin feed stock, such as a mixture of n-butylene and iso-amylene.

The improvement in catalytic activity due to the incorporation of chromium phosphate is distinguished from that due to the known incorporation of chromic oxide since it has been found to provide previously unobtainable improvements in catalytic activity.

As stated above, the dehydrogenation is carried out in the presence of steam at temperatures between 500° and 750° C. The dehydrogenation is advantageously effected at temperatures between 575° and 700° C. and the amount of steam is generally between 5 and 40, preferably between 10 and 25 volumes per volume of hydrocarbon although smaller or larger proportions may be used if desired.

Except for the foregoing limitations, the dehydrogenation conditions may be varied widely. For instance, the method is operable at widely varying flow rates, although the rates of flow should, of course be sufficient to avoid excessive decomposition of the dehydrogenated hydrocarbon product.

To prepare these new catalysts for use in a dehydrogenation process, the reaction chamber is charged with the granular catalysts and the lubricant, if used, is "burnt off" from the catalysts by passing air or preferably a mixture of up to about 50% air with steam, through the catalyst bed at an elevated temperature. When the lubricant used for preparing the catalyst granules is a substance capable of being vapourized, e.g. a mineral or vegetable oil, the burn-off treatment with air/steam may be preceded by one of passing an inert gas such as steam, nitrogen or carbon dioxide over the catalyst at a temperature of from 200 to 600° C. so as to vapourize at least a portion of the binding agent from the catalyst granules. Obviously, steam will not be passed through the catalyst bed until the temperature of the latter exceeds the temperature at which the steam would condense thereon.

After freeing the catalyst of the lubricant, the catalyst bed is swept free of air with steam and is heated to the desired reaction temperature, preferably by passing superheated steam through the bed. A mixture of steam and the hydrocarbon feed is then passed through the catalyst bed at the desired temperature. The usual procedure is to pass the hydrocarbon feed into admixture with steam which has been super-heated to a temperature sufficient for the mixture to be at the desired reaction temperature, and to pass the mixture through the catalyst bed. However, the heat may be supplied in other ways. The vapours issuing from the catalyst chamber are ordinarily passed through heat exchangers and other cooling devices, first to condense the steam and then the dehydrogenated product.

During use in dehydrogenation reactions, these catalysts gradually accumulate a small amount of carbon or non-volatile organic material and lose their catalytic activity. To regenerate such catalysts, the flow of hydrocarbon starting material is periodically interrupted and air, admixed with steam, is blown through the catalyst bed at a suitably elevated temperature, for example at a temperature between 500° and 750° C., to oxidize and remove the carbonaceous or organic material. The duration of the catalyst regeneration period is related to the duration of the preceding dehydrogenation period.

As hereinbefore stated, the catalysts of the present invention are particularly useful in the dehydrogenation of aliphatic monoolefins having at least four carbon atoms in their unsaturated carbon chains to form the corresponding conjugated diolefins, of alkylated aromatic hydrocarbons having at least two carbon atoms in their alkyl groups, of cycloaliphatic olefins having five to eight carbon atoms and of cycloalkanes having five to seven carbon atoms. They are also useful in a modified process for the dehydrogenation of the same materials and of paraffinic hydrocarbons containing at least three carbon atoms, which modified process comprises contacting said hydrocarbons in admixture with steam with the catalyst in the presence of uncombined oxygen.

This modified process is particularly applicable to the dehydrogenation of paraffinic hydrocarbons having three to eight carbon atoms and is especially useful for dehydrogenating normal butane to produce good yields of butylenes and butadiene.

The invention will now be illustrated in the following examples in which, unless otherwise stated, all parts and percentages are by weight. The catalyst of Example 1 is conventional and this example is included for comparison purposes.

EXAMPLE 1

Six litres of an aqueous solution containing 462 g./litre of calcium chloride were filtered and mixed with 1.5 litres of a filtered aqueous solution containing 360 g./litre of nickelous nitrate; this corresponds to a Ca:Ni atomic ratio of 8.5:1. To this solution, there were then added 2333 g. of 85% orthophosphoric acid, thereby giving approximately 8.7% excess phosphoric acid over the amount which would be stoichiometrically required to form calcium phosphate and nickelous phosphate. The solution was ten made up to 12.0 litres with distilled water. This stock solution was then fed at the rate of 5.5 ml. per minute into a 600 ml. breaker where this stock solution was diluted with water and from which it was fed, after dilution, into a glass reaction vessel at the rate of 134 ml. per minute, the reaction vessel having a capacity of 15 litres, being maintained at a temperature of approximately 25° C. and being fitted with a propeller type mixer and baffles for producing turbulence.

An aqueous ammonium hydroxide solution containing 14% w./v. $NH_3$ was also fed into the reaction vessel so that the pH of the agitated mixture was maintained at $8.0 \pm 0.1$.

The resulting slurry was agitated and allowed to overflow from the reaction vessel and to run to waste until steady state conditions were established. The overflowing slurry was then collected in a settling tank for a period of 16 hours and then allowed to settle in contact with the precipitation mother liquor for a further period of 24 hours, after which the mother liquor was decanted from the settling tank and the settled slurry was filtered and washed with distilled water. The washed filter cake was then mulled for one half hour without any heating and then for a few minutes with four litres of distilled water. The resulting slurry was then refiltered and washed with distilled water. The washing treatment comprising the mulling, filtering and washing operations was then repeated until the filtrate was free of chloride ions on testing with aqueous silver nitrate solution. The filter residue was then returned to the muller where it was partially dried for a period of 1½ hours with a 15 p.s.i.g. steam pressure. The partially dried material was then transferred to trays and dried overnight in an oven at 65° C. The oven temperature was then increased to 300° C. and the drying operation was terminated three hours after the commencement of the oven temperature rise.

After removal from the oven, the material was ground by hand to pass through a Tyler Standard 10 mesh sieve and then thoroughly mixed by hand with a mixture of 2% graphite and 2% chromic oxide. This mixture was then formed into $\frac{3}{16}''$ x $\frac{3}{16}''$ pellets with shallow convex ends.

The removal of the graphite was effected by passing a mixture of steam and air over approximately 23 g. of catalyst pellets at the following flow rates for 16 hours at 700° C.:

Steam—2000 ml./minute (calculated at room temperature and pressure)

Air—100 ml./minute (measured at room temperature and pressure)

After the removal of the graphite, twenty catalyst pellets were placed in a glass tube through which helium was passed at the rate of 60 ml./minute (measured at room temperature and pressure). The tube was then heated by means of an electrical furnace until the temperature of the pellets, as indicated by a thermocouple, had risen to about 200° C. Steam was then passed over the catalyst pellets together with the helium at the rate of approximately 3.6 volumes of steam per volume of helium until the pellet temperature was steady at 600° C. A slug of 1.5 ml. of 16% by volume butene-1 in helium was then injected into the helium/steam feed and the dehydrogenated product was analyzed by gas chromotography, no account being taken of the formation of carbonyls or coke.

The "percent conversion" as expressed by 100 times the number of moles butene-1 converted divided by the total number of moles of butene-1 in the feed, and the "percent selectivity" as expressed by 100 times the number of moles of butene-1 converted to butadiene, divided by the total number of moles of butene-1 reacted, were calculated. The following results were obtained:

|  | Percent |
|---|---|
| Conversion | 40.2 |
| Selectivity | 89.4 |

EXAMPLE 2

Another catalyst was prepared as in Example 1 except that 31.3 g. of chromic chloride were dissolved in the stock solution in order to give a product containing approximately 1.0% chromium phosphate expressed as chromic phosphate which is equivalent to 0.5% chromic oxide. The amount of phosphoric acid which was used was increased to 2356 g. in order to form the chromium phosphate and to maintain the original 8.7% excess, calculated as if no chromium were present.

Removal of the graphite at 650° C. and evaluation of this catalyst as described in Example 1 gave the following results:

|  | Percent |
|---|---|
| Conversion | 45.8 |
| Selectivity | 89.2 |

It will be seen that the coprecipitation of a relatively small proportion of chromium phosphate results in a significant increase in the percentage conversion and gives a much more active catalyst than does the simple incorporation of chromic oxide as described in Example 1.

EXAMPLE 3

Another catalyst was prepared as in Example 2 except that 124.7 g. of chromic chloride were dissolved in the stock solution in order to give a product containing 3.8% chromium phosphate expressed as chromic phosphate, which is equivalent to 2.0% chromic oxide. The amount of phosphoric acid which was used was increased to 2424 g. in order to maintain the original 8.7% excess.

This catalyst gave the following results when evaluated as described in Example 2:

|  | Percent |
|---|---|
| Conversion | 46.3 |
| Selectivity | 90.9 |

EXAMPLE 4

Another catalyst was prepared as described in Example 2 except that 311 g. of chromic chloride were dissolved in the stock solution in order to give a product containing 9.8% chromium phosphate expressed as chromic phosphate, which is equivalent to 5.1% chromic oxide. The amount of phosphoric acid which was used was increased to 2560 g. in order to maintain the original 8.7% excess.

This catalyst gave the following results when evaluated as described in Example 2:

|  | Percent |
|---|---|
| Conversion | 43.1 |
| Selectivity | 89.5 |

From these examples, it will be seen that it is possible, in accordance with the present invention, to obtain very significant improvements in catalytic activity.

What is claimed is:

1. In the process for the preparation of a dehydrogenation catalyst which comprises the steps of: (a) precipitating a calcium nickel phosphate catalyst material at a pH value of from about 7.5 to about 8.3 from an aqueous solution containing calcium ions, nickel ions and phosphate ions, the calcium and nickel ions being present in said solution in the relative proportions of from about 7.5 to about 9.2 ions of calcium per ion of nickel; (b) separating the precipitated catalyst material from the precipitation medium; and (c) drying the resultant catalyst material, the improvement which comprises causing chromium phosphate to be coprecipitated with said catalyst material by the addition of a water-soluble chromium compound to said aqueous solution to such an extent that the coprecipitate contains a minor proportion of chromium phosphate.

2. The process of claim 1 in which said water-soluble chromium compound is added to said aqueous solution to such an extent that the coprecipitate contains from about 0.5% to about 10% by weight of chromium phosphate.

3. The process of claim 2 wherein said water-soluble chromium compound is selected from chromic chloride, chromic nitrate and chromic acetate.

4. The process of claim 2 in which said coprecipitation of said calcium nickel phosphate catalyst material and said chromium phosphate is effected by mixing said aqueous solution containing calcium ions, nickel ions, phosphate ions and said water-soluble chromium compound with an aqueous alkali, the relative flow rates of said solutions being controlled so that the pH value of the resulting mixture is within said range of from about 7.5 to about 8.3.

5. In the process for the preparation of a dehydrogenation catalyst which comprises the steps of: (a) precipitating a calcium nickel phosphate catalyst material at a pH value of from about 7.5 to about 8.3 from an aqueous solution containing calcium ions, nickel ions and phosphate ions, the calcium and nickel ions being present in said solution in the relative proportions of from about 7.5 to about 9.2 ions of calcium per ion of nickel; (b) separating the precipitated catalyst material from the precipitation medium; and (c) drying the resultant catalyst material, from about 0.5% to about 5% by weight of chromic oxide being incorporated therein after the precipitation step, the improvement which comprises causing chromium phosphate to be coprecipitated with said catalyst material by the addition of a water-soluble chromium compound to said aqueous solution to such an extent that the coprecipitate contains a minor proportion of chromium phosphate.

6. The process of claim 5 in which said water-soluble chromium compound is added to said aqueous solution to such an extent that the coprecipitate contains from about 0.5% to about 10% by weight of chromium phosphate.

7. The process of claim 6 in which said coprecipitation of said calcium nickel phosphate catalyst material and said chromium phosphate is effected by mixing said aqueous solution containing calcium ions, nickel ions, phosphate ions and said water-soluble chromium compound with an aqueous alkali, the relative flow rates of said solutions being controlled so that the pH value of the resulting mixture is within said range of from about 7.5 to about 8.3.

8. The process of claim 7 wherein said water-soluble chromium compound is selected from chromic chloride, chromic nitrate and chromic acetate.

References Cited

UNITED STATES PATENTS

| | | | |
|---|---|---|---|
| 2,456,368 | 12/1948 | Britton et al. | 252—437 |
| 2,945,900 | 7/1960 | Alexander et al. | 260—680 X |
| 3,327,010 | 6/1967 | Noddings et al. | 260—680 |

PAUL M. COUGHLAN, JR., *Primary Examiner*.